(12) United States Patent
Takatsuka et al.

(10) Patent No.: US 9,342,153 B2
(45) Date of Patent: May 17, 2016

(54) TERMINAL DEVICE AND METHOD FOR CONTROLLING OPERATIONS

(71) Applicant: Sony Corporation, Tokyo (JP)

(72) Inventors: Susumu Takatsuka, Tokyo (JP); Yasushi Okumura, Tokyo (JP); Ikuo Yamano, Tokyo (JP); Hiroyuki Mizunuma, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 14/514,198

(22) Filed: Oct. 14, 2014

(65) Prior Publication Data

US 2016/0103495 A1    Apr. 14, 2016

(51) Int. Cl.
*G06F 3/0346* (2013.01)
*G06F 3/01* (2006.01)
*G06F 3/041* (2006.01)

(52) U.S. Cl.
CPC ............... *G06F 3/017* (2013.01); *G06F 3/041* (2013.01); *G06F 2203/04106* (2013.01)

(58) Field of Classification Search
CPC .... G06F 3/0346; G06F 3/0304; G06F 3/0338
See application file for complete search history.

(56) References Cited

U.S. PATENT DOCUMENTS

| 7,148,879 | B2 | 12/2006 | Amento et al. | |
|---|---|---|---|---|
| 2005/0253806 | A1 | 11/2005 | Liberty et al. | |
| 2007/0252813 | A1 | 11/2007 | Liberty et al. | |
| 2008/0158154 | A1 | 7/2008 | Liberty et al. | |
| 2013/0093676 | A1 | 4/2013 | Liberty et al. | |
| 2014/0125618 | A1 | 5/2014 | Panther et al. | |
| 2014/0143064 | A1* | 5/2014 | Tran ..................... | A61B 5/0022 705/14.66 |
| 2014/0201666 | A1* | 7/2014 | Bedikian ................ | G06F 3/017 715/771 |
| 2014/0282059 | A1* | 9/2014 | Oh .......................... | G06F 13/20 715/744 |
| 2014/0335902 | A1* | 11/2014 | Guba ..................... | H04W 4/027 455/456.4 |
| 2015/0082180 | A1* | 3/2015 | Ames .................. | G06F 3/04815 715/738 |
| 2015/0082181 | A1* | 3/2015 | Ames .................. | G06F 3/04815 715/738 |
| 2015/0085076 | A1* | 3/2015 | Lockhart ............ | H04N 13/0468 348/46 |
| 2015/0091903 | A1* | 4/2015 | Costello ................. | G06T 15/20 345/426 |
| 2015/0100910 | A1* | 4/2015 | Luo ...................... | G06F 3/04883 715/771 |
| 2015/0148632 | A1* | 5/2015 | Benaron ................ | A61B 5/085 600/322 |
| 2015/0173993 | A1* | 6/2015 | Walsh ...................... | A61H 3/00 414/4 |
| 2015/0194040 | A1* | 7/2015 | Fiedler ................. | G08B 21/182 340/870.09 |
| 2015/0321339 | A1* | 11/2015 | Asbeck .................. | A61H 1/024 414/7 |

OTHER PUBLICATIONS

Extended Search Report issued Nov. 19, 2015 in European Patent Application No. 15150491.7

* cited by examiner

*Primary Examiner* — Ricardo L Osorio
(74) *Attorney, Agent, or Firm* — Oblon, McClelland, Maier & Neustadt, L.L.P (57) ABSTRACT

A device includes circuitry configured to acquire detection data from at least one sensor device corresponding to movement of the device. The circuitry is also configured to control at least one sensitivity detection mode of the at least one sensor device and determine a sampling rate for the at least one sensor device based on the at least one sensitivity detection mode. The circuitry is also configured to determine gestures performed by a user based on the detection data from the at least one sensor device and control operation of the device based on the gestures performed by the user.

20 Claims, 11 Drawing Sheets

TERMINAL DEVICE AND METHOD FOR CONTROLLING OPERATIONS

BACKGROUND

1. Technical Field

The present disclosure relates to a terminal device that is worn by, or attached to, a user and a method for operating the terminal device.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Wearable terminal devices can be attached to a user's body. For example, a smart watch is a wristwatch-type wearable terminal device that can be attached to the user's wrist. The smart watch can be equipped with a touchscreen that is approximately the same size as the dial face of a wristwatch with a limited number of buttons, or icons, that can be displayed on the touchscreen. Due to the small size of the touchscreen, the number and type of touch operations can be small compared to terminal devices with larger touchscreens, such as Smart Phones or tablets.

Because the smart watch is attached to the user's wrist, the user performs touch operations with the hand that is on the opposite side of the arm from the arm on which the smart watch is mounted. For example, if the smart watch is mounted on the left arm of the user, the touch screen is operated by the right hand of the user. In addition, if the user is carrying objects in the right hand, such as books, bags, and the like, the user may be unable to perform touch operations on the smart watch.

SUMMARY

A device and method for operating a terminal device are discussed herein.

According to an exemplary embodiment, the disclosure is directed to a device including: circuitry configured to acquire detection data from at least one sensor device corresponding to movement of the device; control at least one sensitivity detection mode of the at least one sensor device; determine a sampling rate for the at least one sensor device based on the at least one sensitivity detection mode; determine gestures performed by a user based on the detection data from the at least one sensor device; and control operation of the device based on the gestures performed by the user.

According to another exemplary embodiment, the disclosure is directed to a method of controlling operation of a device, including: acquiring the detection data from at least one sensor device corresponding to movement of the device; controlling at least one sensitivity detection mode of the at least one sensor device; determining a sampling rate for the at least one sensor device based on the at least one sensitivity detection mode; determining gestures performed by a user based on the detection data from the at least one sensor device; and controlling operation of the device based on the gestures performed by the user.

According to another exemplary embodiment, the disclosure is directed to a non-transitory computer readable medium having instructions stored therein that, when executed by one or more processors, cause the one or more processors to perform a method of controlling operation of a device, wherein the device includes a motion sensor, the method including: acquiring the detection data from at least one sensor device corresponding to movement of the device; controlling at least one sensitivity detection mode of the at least one sensor device; determining a sampling rate for the at least one sensor device based on the at least one sensitivity detection mode; determining gestures performed by a user based on the detection data from the at least one sensor device; and controlling operation of the device based on the gestures performed by the user.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

This disclosure relates to a method of operating a terminal device that is worn by a user. For the remainder of this description, the phrase "terminal device" is meant to describe any sort of electronic device with a touchscreen display and wireless communication capability that can be worn by a user, such as a smart watch. This phrase is not meant to limit the scope of this disclosure, but is used to merely provide a more concise description.

Figure 1:
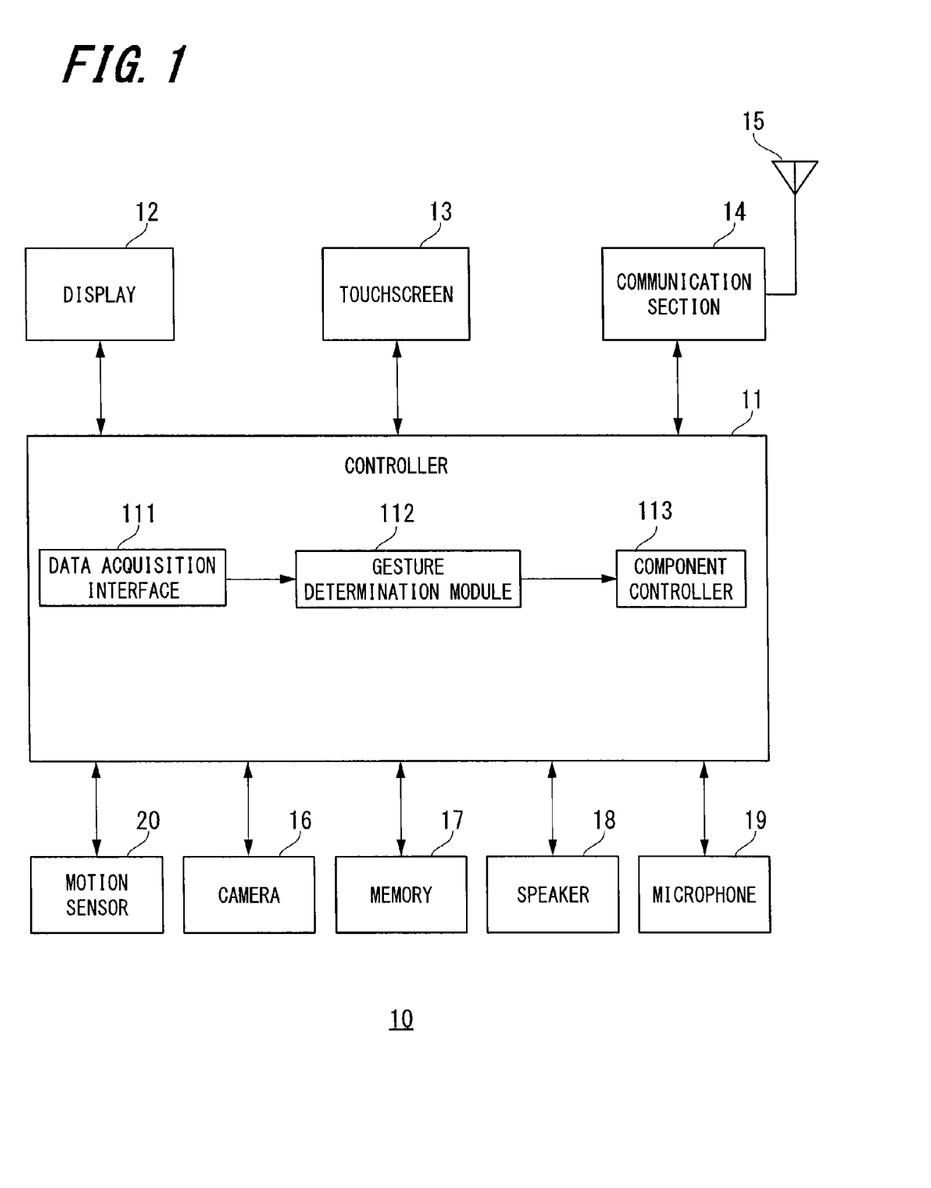
FIG. 1 is a non-limiting block diagram for a terminal device, according to certain embodiments.

FIG. 1 is a non-limiting block diagram for a terminal device 10, according to certain embodiments. The block diagram of the terminal device 10 includes sensors and processing circuitry for controlling operations of the terminal device 10 and can communicate wirelessly. The terminal device 10 can include components such as a controller 11, a display 12, a touchscreen 13, a communication section 14, a camera 16, a memory 17, a speaker 18, a microphone 19, and a motion sensor 20.

The controller 11 may include one or more Central Processing Units (CPUs), and may control each element in the terminal device 10 to perform features related to control for display processing, motion sensor processing, gesture determination processing, and other types of processing. The controller 11 may perform these functions by executing instructions stored in a memory 17. Alternatively or in addition to the local storage of the memory 17, the features may be executed using instructions stored on an external device accessed on a network, or on a non-transitory computer readable medium.

In some implementations, the controller 11 includes a data acquisition interface 111, which obtains one or more signals from one or more signal detection devices, such as the motion sensor 20. In certain embodiments, the one or more signals are referred to as detection data and are obtained at a predetermined sampling rate. The controller 11 also includes a gesture determination module 112 which includes processing circuitry for determining gestures performed by a user wearing the terminal device 10 based on the detection data obtained at the data acquisition interface 111.

The controller 11 also has a component controller 113 which includes control circuitry for determining operational modes for the terminal device 10 based on determined gestures. Once the gesture performed by the user has been determined by the gesture determination module 112, the component controller 113 issues control signals to operate the terminal device 10 based on the gesture performed by the user. For example, the component controller 113 can send a control signal to change a display of the terminal device 10 based on the gesture performed by the user.

In certain embodiments, the component controller 113 issues control signals to set at least one predetermined sensitivity detection mode for the data acquisition interface 111. For example, a low sensitivity detection mode can be set to a first sampling rate, and a high sensitivity detection mode can be set to a second sampling rate that is higher than the first sampling rate. In certain embodiments, when the low sensitivity detection mode is set, less power is consumed by the terminal device 10 than if the high sensitivity detection mode is set, which can preserve battery life of the terminal device 10. Details regarding how the sensitivity detection mode is controlled by the component controller 113 are discussed further herein.

The terminal device 10 includes a display 12. The display 12 displays still and moving image and text data via the controller 11. The display 12 may also display operational inputs such as numbers or icons, which may be used for control of the terminal device 10. The display 10 can also display a graphical user interface such that the user may control aspects of the terminal device 10 and/or other devices.

In certain embodiments, the controller 10 may control the display 10 to display a home screen interface, the most recent interface, or another interface of the terminal device 10. Further, the display 10 may display characters and images received by the terminal device 10 and/or stored in the memory 17 or accessed from an external device on a network. For example, the terminal device 10 may access a network such as the Internet, and display text and/or images transmitted from a Web server. The display screen of the display 12 may be a Liquid Crystal Display (LCD) screen, an organic electroluminescence display panel, or another display screen technology. In certain embodiments, the display 12 can include a backlight that illuminates the display 12 and enables a user to see images that are displayed.

The terminal device 10 is also equipped with a touchscreen 13, which is able to detect when an object such as a finger or a pen touches the display screen. Used herein, the phrase "touch operation" refers to an input operation performed by touching an operation surface of the touchscreen 13 with an instruction object, such as a finger, pen, or stylus-type instrument. In certain aspects of the present disclosure, the touchscreen 13 may be disposed adjacent to the display 12 (e.g., laminated), or may be formed integrally with the display 12. For simplicity, the present disclosure assumes the touchscreen 13 is formed integrally with the display 12 and therefore, examples discussed herein may describe touch operations being performed on the surface of the display 12 rather than the touchscreen 13. However, the skilled artisan will appreciate that this is not limiting.

For simplicity, the present disclosure assumes the touchscreen 13 is an electrostatic capacitance-type touch panel technology; however, it should be appreciated that aspects of the present disclosure may easily be applied to other touch panel types (e.g., resistance type touch panels) with alternate structures. In the case of an electrostatic-capacitance touch panel display, when conductors, such as a finger or stylus, approach or contact the touchscreen 13, the electrodes of the touchscreen 13 may detect and measure electrostatic capacitance changes, and features of the touch operation may be determined based on the detections/measurements.

In certain aspects of the present disclosure, the touchscreen 13 may include transparent electrode touch sensors arranged in the X-Y direction on the surface of transparent sensor glass. In this aspect, the X-axis is a horizontal axis, and the Y-axis is a vertical axis, which are orthogonally crossed. In certain embodiments, the data regarding the position on the X-Y axis that the touch operation occurred is transmitted to the controller 11, which then activates an application based on the touch position. In addition, if more than one touch operation occurs simultaneously in different positions on the display 12, the controller 11 may detect that one or more areas of the display 12 have been touched or that a wide area of the display 12, which may include the entire display 12, has been touched.

The terminal device 10 is equipped with an antenna 15 for communicating with cell towers, other terminal devices, access points, and the like. The antenna 15 is connected to the communication processing section 14. The communication section 14 performs the processes of transmitting and receiving radio signals under the control of the controller 11. The communication section can also be configured to communicate wirelessly with external devices, e.g., via a wireless protocol such as BLUETOOTH, Near Field Communication (NFC), WI-FI, 802.11, etc.

The terminal device 10 can also include a camera 16 that can be a CMOS camera, CCD camera, or the like. In certain embodiments, still images and moving images obtained by the camera 16 can be stored in the memory 17, which can later be shown to a user via the display 12. The terminal device 10 is also equipped with at least one signal detection device, such as a motion sensor 20, according to certain embodiments. The motion sensor 20 can output sensor data to the controller 11 according to the movement of the terminal device 10. Details regarding the motion sensor 20 are discussed further herein. Audio signals can be supplied to a speaker 18, and the speaker 18 outputs a sound corresponding to the audio signal. The terminal device 10 can also include a microphone 19 that can be used in conjunction with the speaker 18 to perform wireless telephone calls via the communication section 14. If the terminal device 100 is not equipped with a voice call function or other audio functions, speaker 18 and microphone 19 may be omitted.

Figure 2:
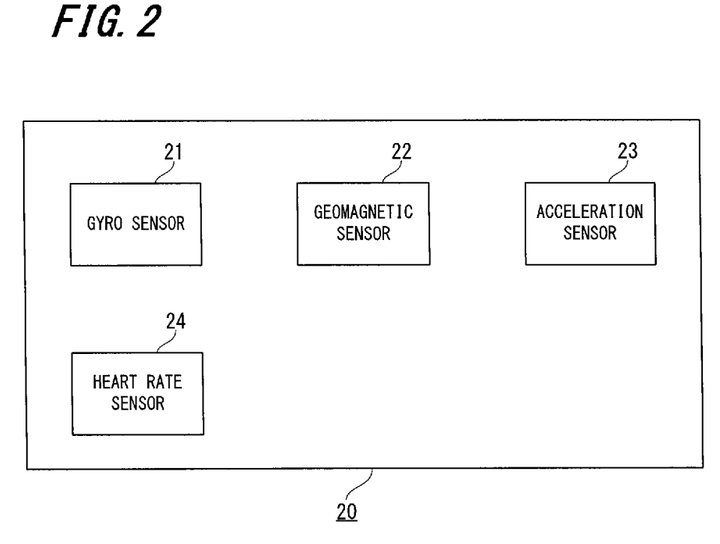
FIG. 2 is an exemplary block diagram of a motion sensor for a terminal device, according to certain embodiments.

FIG. 2 is an exemplary block diagram of a motion sensor 20 for a terminal device 10, according to certain embodiments. The motion sensor 20 can include at least one of a gyro sensor 21, geomagnetic sensor 22, acceleration sensor 23, and heart rate sensor 24. The heart rate sensor 24 can determine the heart rate of a user via light waves, microwaves, infrared signals, optical signals, and the like. The motion sensor 20 is merely exemplary, and various modifications can be included. The detection data output from the motion sensor 20 can include sensor data from the gyro sensor 21, geomagnetic sensor 22, acceleration sensor 23, and heart rate sensor 24 that is obtained by the data acquisition interface 111 of the controller 11. The data acquisition interface 111 includes circuitry that samples the detection data from the gyro sensor 21, geomagnetic sensor 22, acceleration sensor 23, and heart rate sensor 24 at a predetermined sampling rate.

Figure 3:
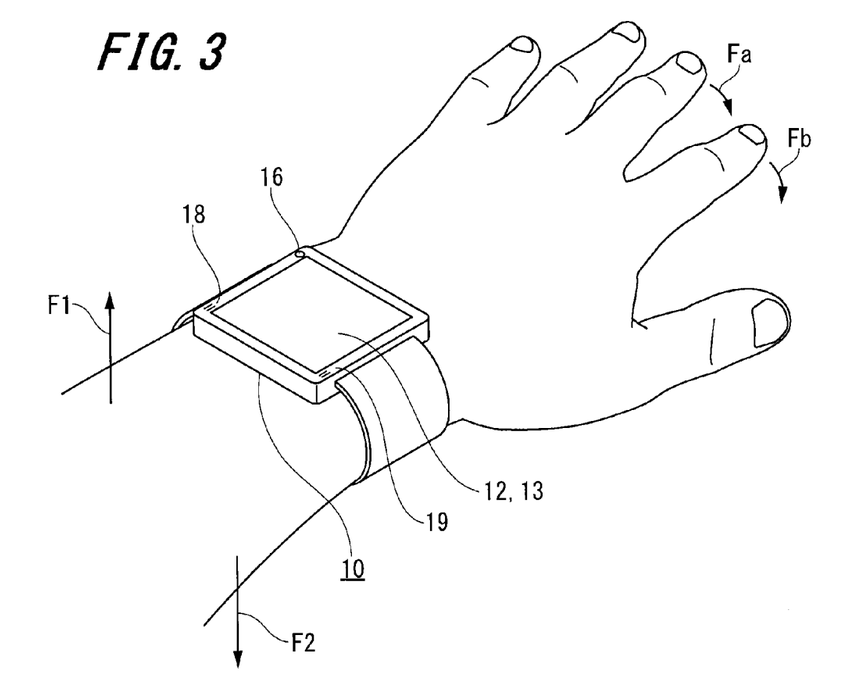
FIG. 3 is an exemplary illustration of a terminal device, according to certain embodiments.

FIG. 3 is an exemplary illustration of a terminal device 10, according to certain embodiments. The terminal device 10 can be worn as a wristwatch that is mounted on an arm of the user, approximately at a location of a wrist as shown in FIG. 3. The display 12 and touchscreen 13 can be arranged on a surface of a case of the terminal device 10. In addition, the camera 16, speaker 18, and microphone 19 can be embedded in the surface of the case of the terminal device 10. The motion sensor 20 is located within the terminal device 10.

According to certain embodiments, the motion sensor 20 detects movement of the user's body. For example, the gesture determination module 112 can determine when the user moves a hand wearing the terminal device 10 in an upward direction F1 or a downward direction F2 based on the detection data from the motion sensor 20. The upward direction F1 and the downward direction F2 of motion can be detected when the terminal device 10 is operating in low sensitivity detection mode or high sensitivity detection mode. The gesture determination module 112 can also detect other gestures performed by the user such as moving the arm in a clockwise or counterclockwise circular direction, moving the arm to trace various shapes, and the like.

The gesture determination module 112 can also detect a tap operation by a middle finger Fa or an index finger Fb of the hand that is mounted with the terminal device 10 based on the detection data from the motion sensor 20. The gesture determination module 112 can detect the tap operations Fa and Fb when the terminal device 10 is operating in the high sensitivity detection mode. If the terminal device 10 is operating in low sensitivity detection mode, the gesture determination module 112 can determine that a tapping motion Fa or Fb has occurred but may be unable to distinguish whether the tap operation by the middle finger Fa or the index finger Fb has been performed. The gesture determination module 112 can also detect other operations by the fingers of the user, which can include patterns of tapping, flicking, finger snapping, tracing one or more predetermined shapes with a finger, and the like.

In certain embodiments, the gesture determination module 112 can determine the gesture performed by the user based on characteristics of sound waves obtained by the microphone 19. For example, the gesture determination module 112 can use low frequency components of the sound signals received by the microphone 19 to determine if tap operations have occurred. In some implementations, frequencies below 100 Hertz (Hz) or 400 Hz received from the microphone 19 are used along with the detection data obtained by the motion sensor 20 to determine if the tap operations Fa and/or Fb have occurred.

Figure 4:
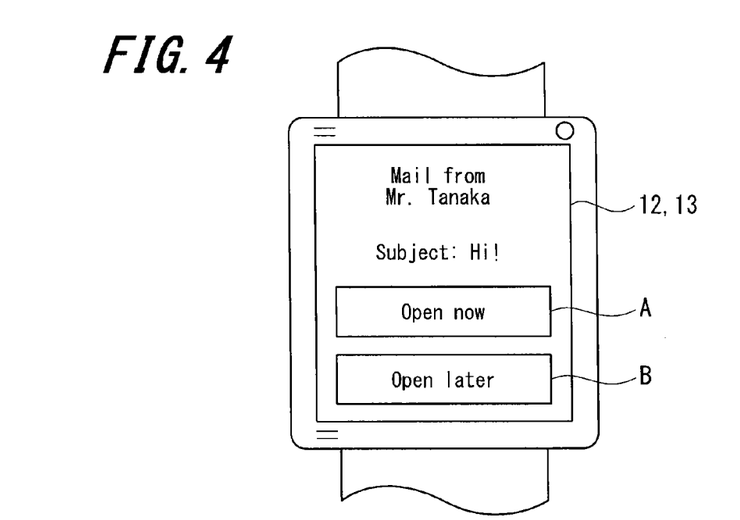
FIG. 4 is an exemplary illustration of tap operations for a terminal device, according to certain embodiments.

FIG. 4 is an exemplary illustration of tap operations for a terminal device, according to certain embodiments. The display 12 illustrates an exemplary screen that is displayed to a user when an incoming email is received. An "open now" button A and an "open later" button B are displayed to the user. If the user touches the "open now" button A on the touchscreen 13 with a finger, then the incoming email is opened. If the user touches the "open later" button B with a finger, then the incoming email is not opened.

The user can also perform the functions of touching the "open now" button A and the "open later" button B by performing tap operations Fa and Fb. For example, in certain embodiments, if the user performs the tap operation Fa with the middle finger, the component controller 113 can determine that the "open now" button A was selected, and the incoming email is opened. If the user performs the tap operation Fb with the index finger, the component controller 113 can determine that the "open later" button B was selected, and the incoming email is not opened. In addition, the functionality of tap operations Fa and Fb can be interchanged such that tap operation Fb can indicate that the "open now" button A was selected, and the tap operation Fb can indicate that the "open later" button B was selected. In some implementations, the functionality of the tap operations Fa and Fb can be determined by the user at an interface where the user inputs settings for the terminal device 10.

Figure 5:
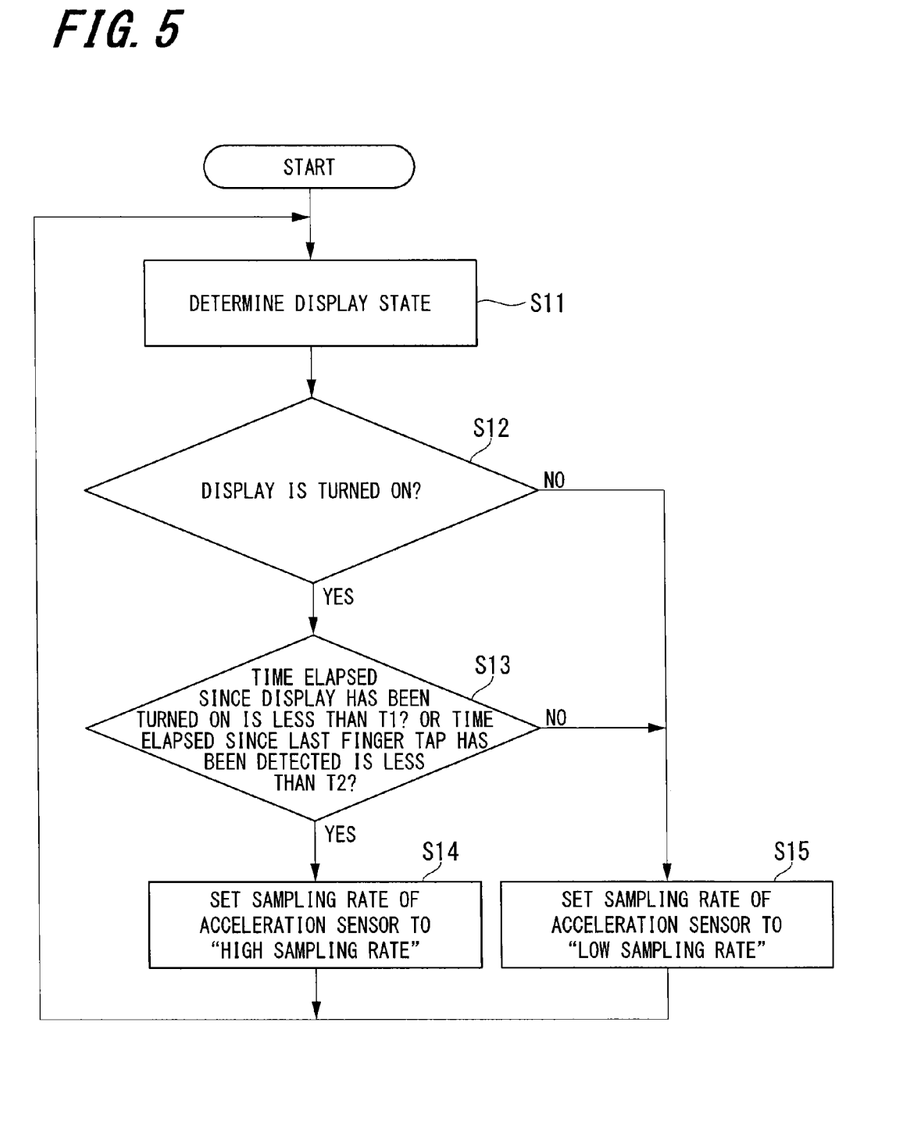
FIG. 5 is an exemplary flowchart of a process for setting a sampling rate of a motion sensor, according to certain embodiments.

FIG. 5 is an exemplary flowchart of a process for setting a sampling rate of a motion sensor, according to certain embodiments. At step S11, the component controller 113 determines the state of the display 12. For example, the state of the display 12 can include whether the display 12 is turned on and displaying images to the user or whether the display 12 is turned off.

At step S12, it is determined if the display 12 is turned on. According to certain embodiments, the display 12 is turned on when a backlight for the display 12 is illuminated.

If the component controller 113 determines that the display is turned on, resulting in a "yes" at step S12, then step S13 is performed. Otherwise, if the component controller 113 determines that the display is turned off, resulting in a "no" at step S12, then step S15 is performed.

At step S13, the component controller 113 determines whether an amount of time since the display 12 has been turned on is less than a first predetermined time period T1. The component controller 113 also determines whether an amount of time since the last tap operation, such as Fa or Fb, was detected by the gesture determination module 112 is less than a second predetermined time period T2. If the amount of time since the display 12 has been turned on is less than the first predetermined time period T1 or the amount of time since the last tap operation was detected is less than the second predetermined time period T2, resulting in a "yes" at step S13, then step S14 is performed. Otherwise, if the amount of time since the display 12 has been turned on is greater than or equal to the first predetermined time period T1 and the amount of time since the last tap operation was detected is greater than or equal to the second predetermined time period T2, resulting in a "no" at step S13, then step S15 is performed.

At step S14, the component controller 113 sends a control signal to set the high sensitivity detection mode, and the acceleration sensor 23 is set to the second sampling rate that is higher than the first sampling rate. The other components of the motion sensor 20, such as the gyro sensor 21, geomagnetic sensor 22, and/or heart rate sensor 24 can also be set to the second sampling rate. The high sensitivity detection mode is set if the amount of time since the display 12 was turned on is less than the first predetermined period of time T1. The high sensitivity detection mode is also set if the amount of time since a tap operation has occurred is less than the second predetermined period of time T2. When the high sensitivity detection mode is set, the gesture determination module 112 is able to detect subtle motion by the user, such as the tap operations Fa and Fb.

At step S15, the component controller 113 sends a control signal to set the low sensitivity detection mode, and the acceleration sensor 23 is set to the first sampling rate that is lower than the second sampling rate. The other components of the motion sensor 20, such as the gyro sensor 21, geomagnetic sensor 22, and/or heart rate sensor 24 can also be set to the first sampling rate. The low sensitivity detection mode is set if the amount of time since the display 12 was turned on is greater than or equal to the first predetermined period of time T1 and if the amount of time since a tap operation has occurred is greater than or equal to the second predetermined period of time T2. After step S14 or S15 is performed, the component controller 113 returns to step S11.

Figure 6:
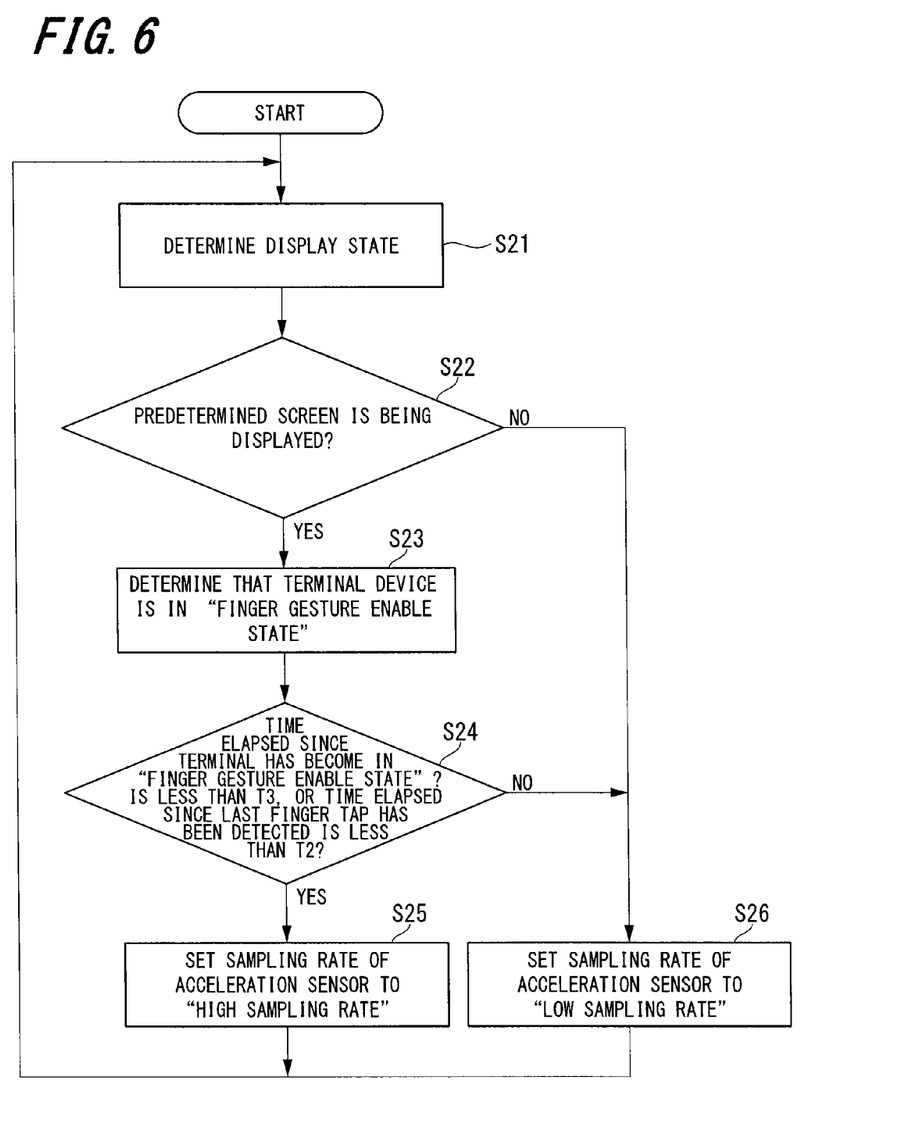
FIG. 6 is an exemplary flowchart of a process for setting a sampling rate of a motion sensor based on display screen content, according to certain embodiments.

FIG. 6 is an exemplary flowchart of a process for setting a sampling rate of a motion sensor based on display screen content, according to certain embodiments. At step S21, the component controller 113 determines the state of the display 12. For example, the state of the display 12 can be determined based on the content that is displayed to the user on a screen of the display 12.

At step S22, the component controller 113 determines whether the display 12 is displaying one of at least one predetermined screen to the user. For example, the at least one predetermined screen can be a home screen, a screen that receives character or number inputs from the user, a screen that notifies the user of an alarm, a screen that alerts the user that an email or phone call has been received, and the like. If one of the at least one predetermined screen is being displayed to the user, resulting in a "yes" at step S22, then step S23 is performed. Otherwise, if one of the at least one predetermined screen is not being displayed to the user, resulting in a "no" at step S22, then step S26 is performed. At step S23, if one of the at least one predetermined screens is displayed to the user, then the component controller 113 determines that the terminal device 10 is in a finger gesture enable state. The finger gesture enable state can be a state in which tap operations, such as Fa and Fb, may be allowed by the component controller 113.

At step S24, the component controller 113 determines whether an amount of time since the finger gesture enable state has been enabled is less than a third predetermined time period T3. The component controller 113 also determines whether an amount of time since the last tap operation, such as Fa or Fb, was detected by the gesture determination module 112 is less than a second predetermined time period T2. If the amount of time since the finger gesture enable state has been enabled is less than a third predetermined time period T3 or the amount of time since the last tap operation was detected is less than the second predetermined time period T2, resulting in a "yes" at step S24, then step S25 is performed. Otherwise, if the amount of time since the finger gesture enable state has been enabled is greater than or equal to a third predetermined time period T3 and the amount of time since the last tap operation was detected is greater than or equal to the second predetermined time period T2, resulting in a "no" at step S24, then step S26 is performed.

At step S25, the component controller 113 sends a control signal to set the high sensitivity detection mode, and the acceleration sensor 23 is set to the second sampling rate that is higher than the first sampling rate. The other components of the motion sensor 20, such as the gyro sensor 21, geomagnetic sensor 22, and/or heart rate sensor 24 can also be set to the second sampling rate. The high sensitivity detection mode is set if the amount of time since the finger gesture enable state has been enabled is less than a third predetermined time period T3. The high sensitivity detection mode is also set if the amount of time since a tap operation has occurred is less than the second predetermined period of time T2.

At step S26, the component controller 113 sends a control signal to set the low sensitivity detection mode, and the acceleration sensor 23 is set to the first sampling rate that is lower than the second sampling rate. The other components of the motion sensor 20, such as the gyro sensor 21, geomagnetic sensor 22, and/or heart rate sensor 24 can also be set to the first sampling rate. The low sensitivity detection mode is set if the amount of time since the finger gesture enable state has been enabled is greater than or equal to a third predetermined time period T3 and if the amount of time since a tap operation has occurred is greater than or equal to the second predetermined period of time T2. After step S25 or S26 is performed, the component controller 113 returns to step S21.

Figure 7:
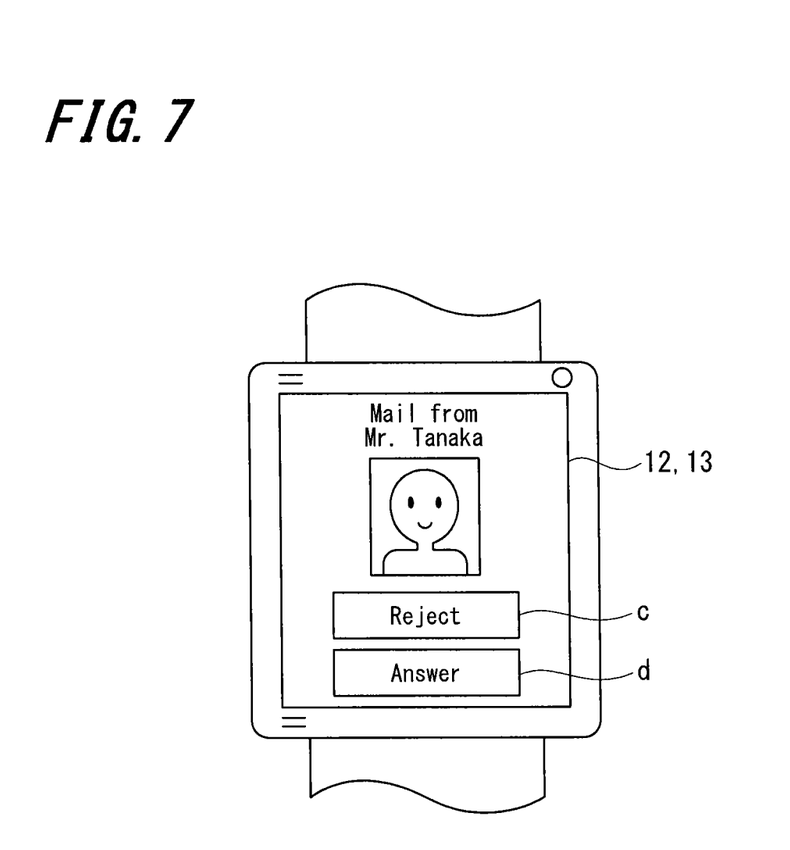
FIG. 7 is an exemplary illustration of finger gestures for a terminal device, according to certain embodiments.

FIG. 7 is an exemplary illustration of finger gestures for a terminal device 10, according to certain embodiments. The display 12 illustrates an exemplary screen that is displayed to a user when an incoming phone call is received. A "reject" button C and an "answer" button D are displayed to the user. If the user touches the "reject" button C on the touchscreen 13 with a finger, then the incoming phone call is refused and not answered. If the user touches the "answer" button D with a finger, then the incoming phone call is answered.

The user can also perform the functions of touching the "reject" button C and the "answer" button D by performing tap operations Fa and Fb. For example, in certain embodiments, if the user performs the tap operation Fa with the middle finger, the component controller 113 can determine that the "reject" button C was selected, and the incoming phone call is refused. If the user performs the tap operation Fb with the index finger, the component controller 113 can determine that the "answer" button D was selected, and the incoming phone call is answered. In addition, the functionality of tap operations Fa and Fb can be interchanged such that tap operation Fb can indicate that the "reject" button C was selected, and the tap operation Fb can indicate that the "answer" button D was selected. In some implementations, the functionality of the tap operations Fa and Fb can be determined by the user at an interface where the user inputs settings for the terminal device 10.

Figure 8:
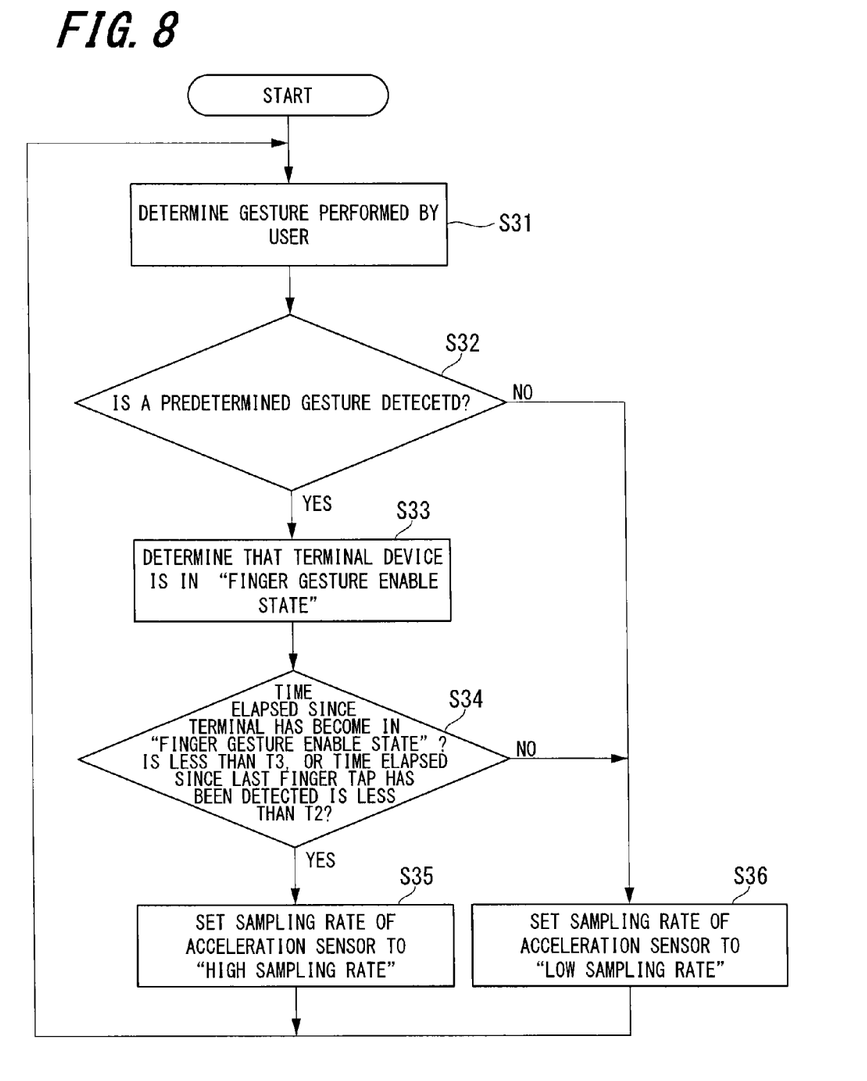
FIG. 8 is an exemplary flowchart of a process for setting a sampling rate of a motion sensor based on gestures, according to certain embodiments.

FIG. 8 is an exemplary flowchart of a process for setting a sampling rate of a motion sensor based on gestures, according to certain embodiments. At step S31, the gesture performed by the user is determined by the gesture determination module 112 based on the detection data obtained by the acceleration sensor 23. In some implementations, the gesture performed by the user can be determined based on detection data obtained from the gyro sensor 21, geomagnetic sensor 22, and/or heart rate sensor 24.

At step S32, the component controller 113 determines whether the gesture performed by the user is one of at least one predetermined gesture. For example, the at least one predetermined gesture can be a tap operation of a finger, shaking of an arm, swinging an arm in an upward direction, and the like. If one of the at least one predetermined gesture is being performed by the user, resulting in a "yes" at step S32, then step S33 is performed. Otherwise, if one of the at least one predetermined gestures is not being performed by the user, resulting in a "no" at step S32, then step S36 is performed. At step S33, if one of the at least one predetermined gestures is being performed by the user, then the component controller 113 determines that the terminal device 10 is in the finger gesture enable state.

At step S34, the component controller 113 determines whether an amount of time since the finger gesture enable state has been enabled is less than a third predetermined time period T3. The component controller 113 also determines whether an amount of time since the last tap operation, such as Fa or Fb, was detected by the gesture determination module 112 is less than a second predetermined time period T2. If the amount of time since the finger gesture enable state has been enabled is less than a third predetermined time period T3 or the amount of time since the last tap operation was detected is less than the second predetermined time period T2, resulting in a "yes" at step S34, then step S35 is performed. Otherwise, if the amount of time since the finger gesture enable state has been enabled is greater than or equal to a third predetermined time period T3 and the amount of time since the last tap operation was detected is greater than or equal to the second predetermined time period T2, resulting in a "no" at step S34, then step S36 is performed.

At step S35, the component controller 113 sends a control signal to set the high sensitivity detection mode, and the acceleration sensor 23 is set to the second sampling rate that is higher than the first sampling rate. The other components of the motion sensor 20, such as the gyro sensor 21, geomagnetic sensor 22, and/or heart rate sensor 24 can also be set to the second sampling rate. The high sensitivity detection mode is set if the amount of time since the finger gesture enable state has been enabled is less than a third predetermined time period T3. The high sensitivity detection mode is also set if the amount of time since a tap operation has occurred is less than the second predetermined period of time T2.

At step S36, the component controller 113 sends a control signal to set the low sensitivity detection mode, and the acceleration sensor 23 is set to the first sampling rate that is lower than the second sampling rate. The other components of the motion sensor 20, such as the gyro sensor 21, geomagnetic sensor 22, and/or heart rate sensor 24 can also be set to the first sampling rate. The low sensitivity detection mode is set if the amount of time since the finger gesture enable state has been enabled is greater than or equal to a third predetermined time period T3 and if the amount of time since a tap operation has occurred is greater than or equal to the second predetermined period of time T2. After step S35 or S36 is performed, the component controller 113 returns to step S31.

Figure 9:
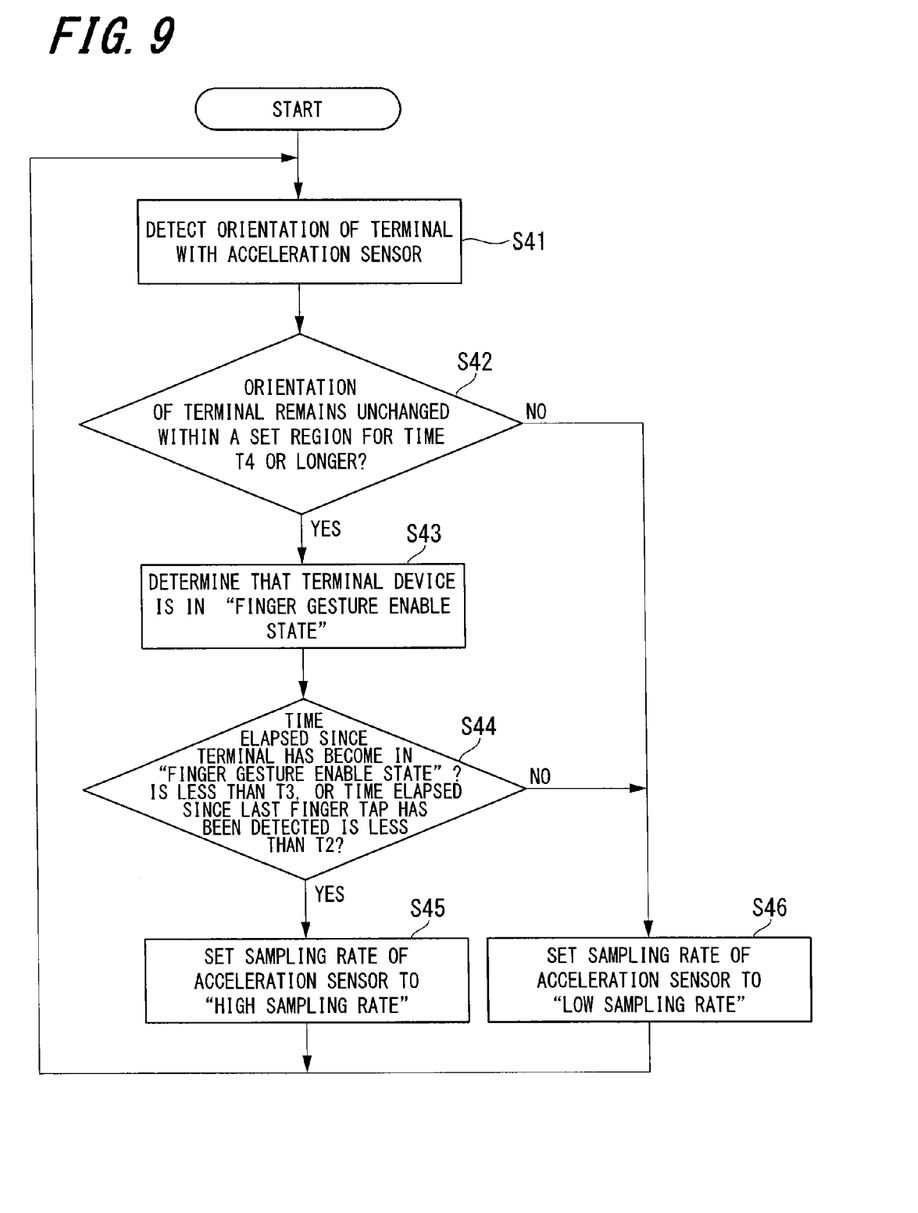
FIG. 9 is an exemplary flowchart of a process for setting a sampling rate of a motion sensor based on a change in location or direction of motion of the terminal device, according to certain embodiments.

FIG. 9 is an exemplary flowchart of a process for setting a sampling rate of a motion sensor based on a change in location or direction of motion of the terminal device 10, according to certain embodiments. At step S41, the component controller 113 determines an orientation of the terminal device 10. For example, the component controller 113 can determine that the terminal device 10 is at rest or that the angle of orientation of the terminal device 10 is approximately equal to an orientation angle of the user's wrist when typing at a computer or reading a book.

At step S42, the component controller 113 determines whether the terminal device 10 has remained at approximately the same orientation angle and has remained approximately at rest for a fourth predetermined period of time T4. The orientation and movement of the terminal device can be based on the detection data from at least one of the acceleration sensor 23, gyro sensor 21, geomagnetic sensor 22, and/or heart rate sensor 24. In some implementations, the fourth period of time T4 is equal to the first period of time T1. If the amount of time that the terminal device 10 has remained at approximately the same orientation angle and at rest is less than the fourth predetermined period of time T4, resulting in a "yes" at step S42, then step S43 is performed. Otherwise, if the amount of time that the terminal device 10 has remained at approximately the same orientation angle and at rest is greater than or equal to the fourth predetermined period of time T4, resulting in a "no" at step S42, then step S46 is performed. At step S43, if the orientation and movement of the terminal device 10 is approximately unchanged for the predetermined period of time T4, then the component controller 113 determines that the terminal device 10 is in the finger gesture enable state.

At step S44, the component controller 113 determines whether an amount of time since the finger gesture enable state has been enabled is less than a third predetermined time period T3. The component controller 113 also determines whether an amount of time since the last tap operation, such as Fa or Fb, was detected by the gesture determination module 112 is less than a second predetermined time period T2. If the amount of time since the finger gesture enable state has been enabled is less than a third predetermined time period T3 or the amount of time since the last tap operation was detected is less than the second predetermined time period T2, resulting in a "yes" at step S44, then step S45 is performed. Otherwise, if the amount of time since the finger gesture enable state has been enabled is greater than or equal to a third predetermined time period T3 and the amount of time since the last tap operation was detected is greater than or equal to the second predetermined time period T2, resulting in a "no" at step S44, then step S46 is performed.

At step S45, the component controller 113 sends a control signal to set the high sensitivity detection mode, and the acceleration sensor 23 is set to the second sampling rate that is higher than the first sampling rate. The other components of the motion sensor 20, such as the gyro sensor 21, geomagnetic sensor 22, and/or heart rate sensor 24 can also be set to the second sampling rate. The high sensitivity detection mode is set if the amount of time since the finger gesture enable state has been enabled is less than a third predetermined time period T3. The high sensitivity detection mode is also set if the amount of time since a tap operation has occurred is less than the second predetermined period of time T2.

At step S46, the component controller 113 sends a control signal to set the low sensitivity detection mode, and the acceleration sensor 23 is set to the first sampling rate that is lower than the second sampling rate. The other components of the motion sensor 20, such as the gyro sensor 21, geomagnetic sensor 22, and/or heart rate sensor 24 can also be set to the first sampling rate. The low sensitivity detection mode is set if the amount of time since the finger gesture enable state has been enabled is greater than or equal to a third predetermined time period T3 and if the amount of time since a tap operation has occurred is greater than or equal to the second predetermined period of time T2. After step S45 or S46 is performed, the component controller 113 returns to step S41.

Figure 10:
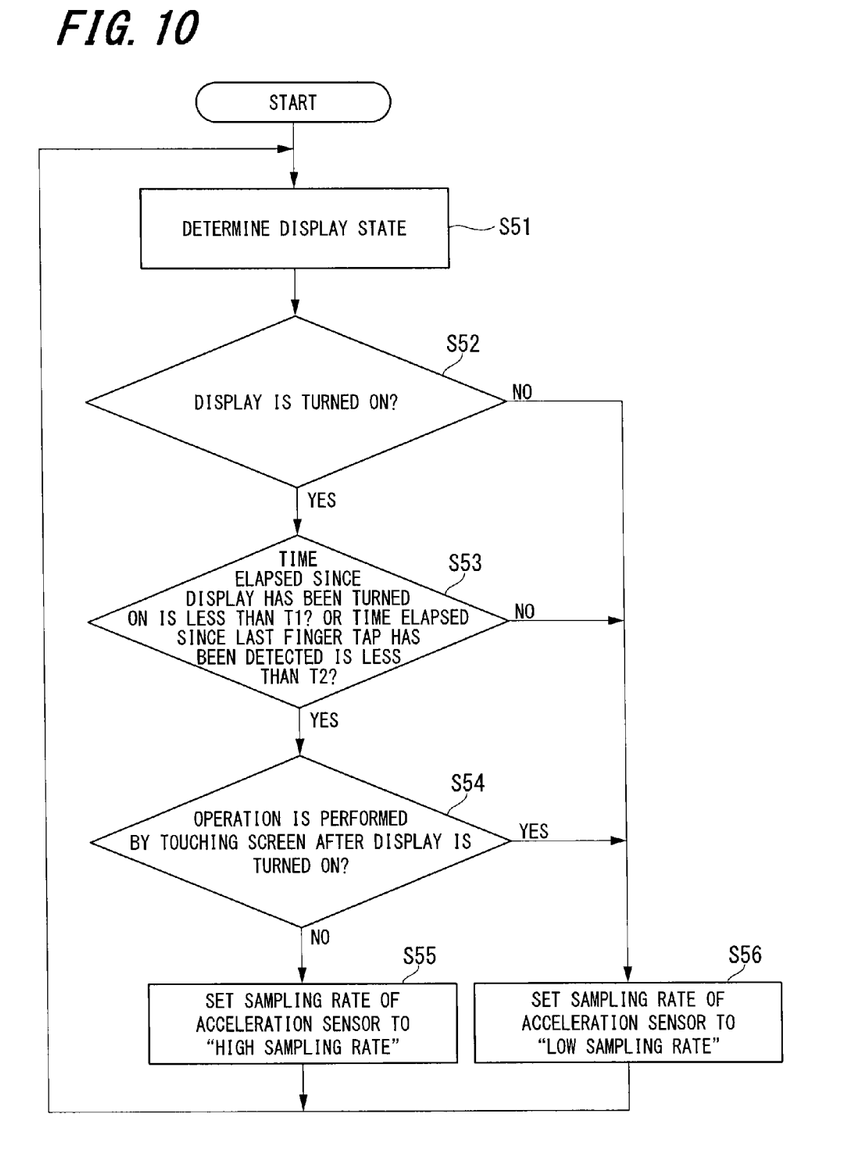
FIG. 10 is an exemplary flowchart of a process for setting a sampling rate of a motion sensor based on a display state and a touchscreen operation, according to certain embodiments.

FIG. 10 is an exemplary flowchart of a process for setting a sampling rate of a motion sensor based on a display state and a touchscreen operation, according to certain embodiments. At step S51, the component controller 113 determines the state of the display 12. For example, the state of the display 12 can include whether the display 12 is turned on and displaying images to the user or whether the display 12 is turned off.

At step S52, it is determined if the display 12 is turned on. According to certain embodiments, the display 12 is turned on when a backlight for the display 12 is illuminated. If the component controller 113 determines that the display is turned on, resulting in a "yes" at step S52, then step S53 is performed. Otherwise, if the component controller 113 determines that the display is turned off, resulting in a "no" at step S52, then step S56 is performed.

At step S53, the component controller 113 determines whether an amount of time since the display 12 has been turned on is less than a first predetermined time period T1. The component controller 113 also determines whether an amount of time since the last tap operation, such as Fa or Fb, was detected by the gesture determination module 112 is less than a second predetermined time period T2. If the amount of time since the display 12 has been turned on is less than the first predetermined time period T1 or the amount of time since the last tap operation was detected is less than the second predetermined time period T2, resulting in a "yes" at step S53, then step S54 is performed. Otherwise, if the amount of time since the display 12 has been turned on is greater than or equal to the first predetermined time period T1 and the amount of time since the last tap operation was detected is greater than or equal to the second predetermined time period T2, resulting in a "no" at step S53, then step S56 is performed.

At step S54, the component controller 113 determines if a touch operation, such as selecting a button on the touchscreen 13, has been performed by the user while the display 12 is turned on. If a touch operation is not detected at the touchscreen 13 when the display 12 is turned on, resulting in a "no" at step S54, then step S55 is performed. Otherwise, a touch operation is detected at the touchscreen 13 when the display 12 is turned on, resulting in a "yes" at step S54, then step S56 is performed.

At step S55, the component controller 113 sends a control signal to set the high sensitivity detection mode, and the acceleration sensor 23 is set to the second sampling rate that is higher than the first sampling rate. The other components of the motion sensor 20, such as the gyro sensor 21, geomagnetic sensor 22, and/or heart rate sensor 24 can also be set to the second sampling rate. The high sensitivity detection mode is set if the touch operation is not detected at the touchscreen 13 when the display 12 is turned on, which may indicate that the user intends to use tap operations, such as Fa and Fb, to operate the terminal device 10. The high sensitivity detection mode is also set if the amount of time since a tap operation has occurred is less than the second predetermined period of time T2.

At step S56, the component controller 113 sends a control signal to set the low sensitivity detection mode, and the acceleration sensor 23 is set to the first sampling rate that is lower than the second sampling rate. The other components of the motion sensor 20, such as the gyro sensor 21, geomagnetic sensor 22, and/or heart rate sensor 24 can also be set to the first sampling rate. The low sensitivity detection mode is set if the touch operation is detected at the touchscreen 13 when the display 12 is turned on, which may indicate that the user intends to use touch operations to operate the terminal device 10. After step S55 or S56 is performed, the component controller 113 returns to step S51.

Figure 11:
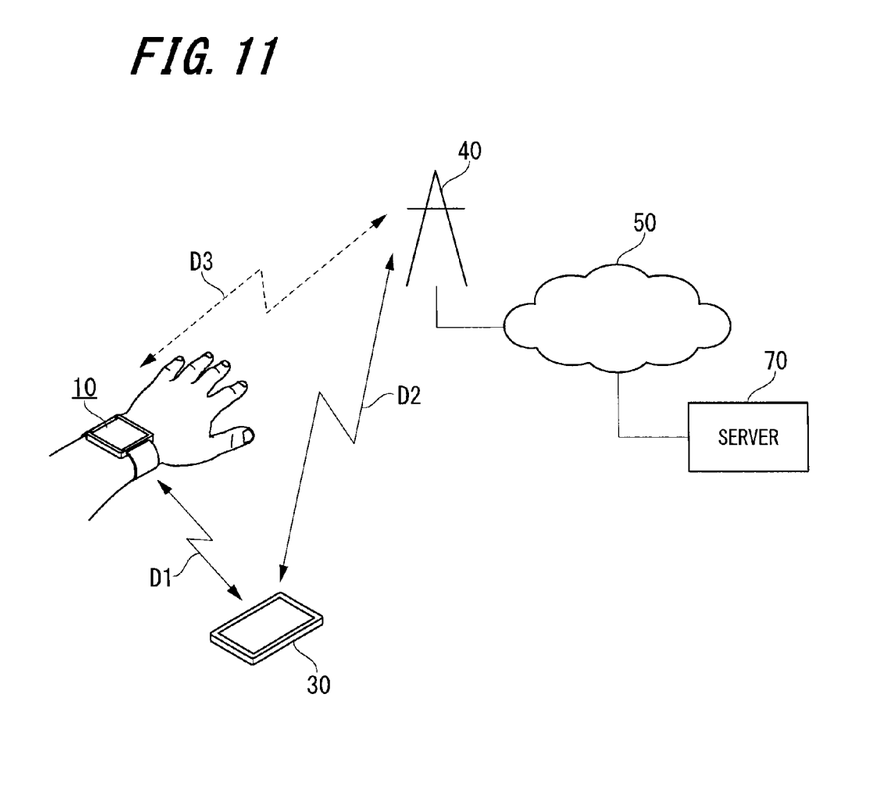
FIG. 11 is an exemplary illustration of an external server that performs gesture determination, according to certain embodiments.

FIG. 11 is an exemplary illustration of an external server that performs gesture determination, according to certain embodiments. In certain implementations, the terminal device 10 communicates wirelessly with Smart Phone 30 via data transmission path D1, and the Smart Phone 30 communicates wirelessly with base station 40 via data transmission path D2. In certain embodiments, the terminal device 10 can wirelessly communicate directly with the base station 40 via data transmission path D3. The base station 40 can be connected to a server 70 via a network 50, such as the internet.

The detection data from the acceleration sensor 23, gyro sensor 21, geomagnetic sensor 22, and/or heart rate sensor 24 in the terminal device 10 can be transmitted to the server 70 via the data transmission paths D1 and D2 or the data transmission path D3 and via the network 50. The server 70 can determine the gesture performed by the user based on the detection data and then transmit the result of the gesture determination to the terminal device 10 via the network 50 and the data transmission paths D1 and D2 or the data transmission path D3. The component controller 113 in the terminal device 10 can determine the sensitivity detection mode and sampling rate based on the gesture determination by the server 70.

Figure 12:
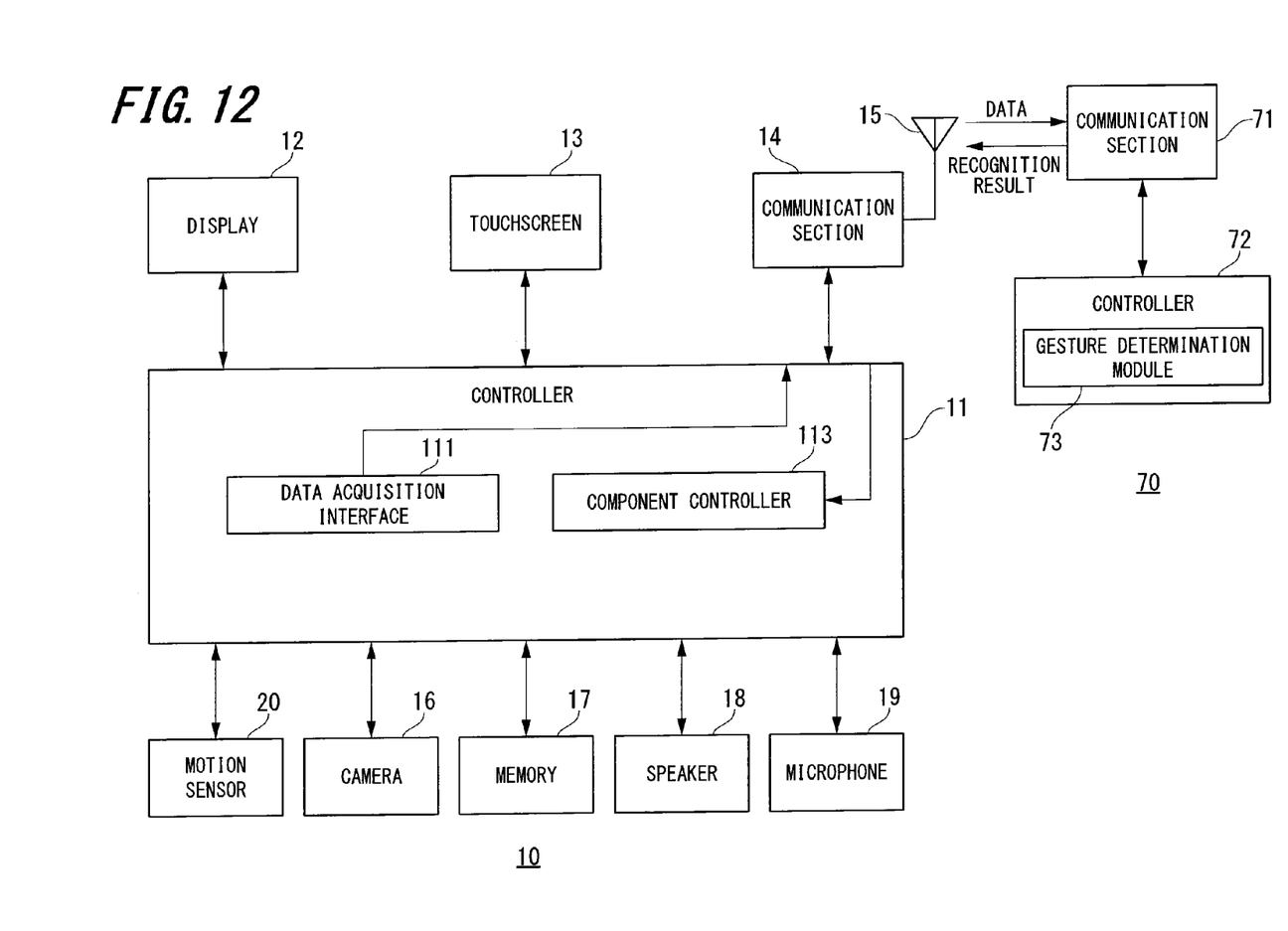
FIG. 12 is an exemplary block diagram of a gesture determining system, according to certain embodiments.

FIG. 12 is an exemplary block diagram of a gesture determination system, according to certain embodiments. The gesture determination system can include the terminal device 10 and the server 70, with the server 70 performing gesture determination. The terminal device 10 can include components such as the controller 11, display 12, touchscreen 13, communication section 14, camera 16, memory 17, speaker 18, microphone 19, and motion sensor 20, as previously discussed. The controller 11 can include the data acquisition interface 111 and the component controller 113.

In certain implementations, the terminal device 10 transmits detection data obtained by the data acquisition interface 111 to the server via the communication section 14 and antenna 15. The server 70 receives the transmitted detection data via a server communication section 71, and the detection data is sent to a gesture determination module 73 of a controller 72 in the server 70. The processing circuitry of the gesture determination module 73 determines the gesture performed by the user wearing the terminal device 10. The result of the gesture determination can be referred to as a gesture recognition result, which is transmitted from the server communication section 71 to the component controller 113 of the terminal device via the communication section 14. The component controller 113 can determine the sensitivity detection mode and sampling rate for the data acquisition interface 111 as previously discussed based on the gesture determination made by the gesture determination module 73 of the server 70.

Aspects of this disclosure are directed to a terminal device 10 worn by a user, such as a smart watch, that determines gestures performed by the user. In certain embodiments, other types of terminal devices, such as Smart Phones, tablets, laptops, and the like can also be configured to detect operations of a user and modify sampling rates of sensors within the terminal devices.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

The above disclosure also encompasses the embodiments noted below.

(1) A device including: circuitry configured to acquire detection data from at least one sensor device corresponding to movement of the device; control a at least one sensitivity detection mode of the at least one sensor device; determine a sampling rate for the at least one sensor device based on the sensitivity detection mode; determine gestures performed by a user based on the detection data from the at least one sensor device; and control operation of the device based on the gestures performed by the user.

(2) The device of (1), wherein the at least one sensor device includes at least one of an acceleration sensor, a gyro sensor, a geomagnetic sensor, and a heart rate sensor.

(3) The device of (1) or (2), wherein the at least one sensitivity detection mode includes a high sensitivity detection mode and a low sensitivity detection mode.

(4) The device of any one of (1) to (3), wherein a first sampling rate is associated with the low sensitivity detection mode.

(5) The device of any one of (1) to (4), wherein a second sampling rate that is higher than the first sampling rate is associated with the high sensitivity detection mode.

(6) The device of any one of (1) to (5), wherein the gestures performed by the user include movement of a hand wearing the device in an upward or downward direction.

(7) The device of any one of (1) to (6), wherein the gestures performed by the user include tap operations performed by at least one finger of the user.

(8) The device of any one of (1) to (7), wherein the circuitry is configured to determine the at least one finger that performed the tap operations in the high sensitivity detection mode.

(9) The device of any one of (1) to (8), wherein the user operates the device based on the tap operations performed by the at least one finger.

(10) The device of any one of (1) to (9), wherein the circuitry is configured to control the at least one sensitivity detection mode based an amount of time since a display of the device was turned on and an amount of time since a tap operation was detected.

(11) The device of any one of (1) to (10), wherein the circuitry is configured to control the at least one sensitivity detection mode based on a touch operation performed by the user.

(12) The device of any one of (1) to (11), wherein the circuitry is configured to determine that the device is in a finger gesture enable state.

(13) The device of any one of (1) to (12), wherein the circuitry is configured to determine that the device is in the finger gesture enable state when at least one predetermined screen is displayed.

(14) The device of any one of (1) to (13), wherein the circuitry is configured to determine that the device is in the finger gesture enable state when at least one predetermined gesture is performed by the user.

(15) The device of any one of (1) to (14), wherein the circuitry is configured to determine that the device is in the finger gesture enable state when an orientation and the movement of the device are approximately unchanged for a predetermined period of time.

(16) The device of any one of (1) to (15), wherein the circuitry is configured to control the at least one sensitivity detection mode based an amount of time since the finger gesture enable state was enabled and an amount of time since a tap operation was detected.

(17) The device of any one of (1) to (16), wherein the circuitry is configured to wirelessly transmit the detection data to a server.

(18) The device of any one of (1) to (17), wherein the circuitry is configured to receive gesture determination information determined by the server.

(19) A method of controlling operation of a device, including: acquiring detection data from at least one sensor device corresponding to movement of the device; controlling at least one sensitivity detection mode of the at least one sensor device; determining a sampling rate for the at least one sensor device based on the sensitivity detection mode; determining gestures performed by a user based on the detection data from the at least one sensor device; and controlling operation of the device based on the gestures performed by the user.

(20) A non-transitory computer readable medium having instructions stored therein that, when executed by one or more processors, cause the one or more processors to perform a method of controlling operation of a device, wherein the device includes a motion sensor, the method including: acquiring detection data from at least one sensor device corresponding to movement of the device; controlling at least one sensitivity detection mode of the at least one sensor device; determining a sampling rate for the at least one sensor device based on the sensitivity detection mode; determining gestures performed by a user based on the detection data from the at least one sensor device; and controlling operation of the device based on the gestures performed by the user.

The invention claimed is:
1. A device comprising:
circuitry configured to
    acquire detection data from at least one sensor device corresponding to movement of the device,
    control at least one sensitivity detection mode of the at least one sensor device,
    determine a sampling rate for the at least one sensor device based on the sensitivity detection mode,
    determine gestures performed by a user based on the detection data from the at least one sensor device, and control operation of the device based on the gestures performed by the user.

2. The device of claim 1, wherein the at least one sensor device includes at least one of an acceleration sensor, a gyro sensor, a geomagnetic sensor, and a heart rate sensor.

3. The device of claim 1, wherein the at least one sensitivity detection mode includes a high sensitivity detection mode and a low sensitivity detection mode.

4. The device of claim 3, wherein a first sampling rate is associated with the low sensitivity detection mode.

5. The device of claim 4, wherein a second sampling rate that is higher than the first sampling rate is associated with the high sensitivity detection mode.

6. The device of claim 1, wherein the gestures performed by the user include movement of a hand wearing the device in an upward or downward direction.

7. The device of claim 1, wherein the gestures performed by the user include tap operations performed by at least one finger of the user.

8. The device of claim 7, wherein the circuitry is configured to determine the at least one finger that performed the tap operations in a high sensitivity detection mode.

9. The device of claim 7, wherein the user operates the device based on the tap operations performed by the at least one finger.

10. The device of claim 1, wherein the circuitry is configured to control the at least one sensitivity detection mode based on an amount of time since a display of the device was turned on and an amount of time since a tap operation was detected.

11. The device of claim 1, wherein the circuitry is configured to control the at least one sensitivity detection mode based on a touch operation performed by the user.

12. The device of claim 1, wherein the circuitry is configured to determine that the device is in a finger gesture enable state.

13. The device of claim 12, wherein the circuitry is configured to determine that the device is in the finger gesture enable state when at least one predetermined screen is displayed.

14. The device of claim 12, wherein the circuitry is configured to determine that the device is in the finger gesture enable state when at least one predetermined gesture is performed by the user.

15. The device of claim 12, wherein the circuitry is configured to determine that the device is in the finger gesture enable state when an orientation and the movement of the device are approximately unchanged for a predetermined period of time.

16. The device of claim 12, wherein the circuitry is configured to control the at least one sensitivity detection mode based on an amount of time since the finger gesture enable state was enabled and an amount of time since a tap operation was detected.

17. The device of claim 1, wherein the circuitry is configured to wirelessly transmit the detection data to a server.

18. The device of claim 17, wherein the circuitry is configured to receive gesture determination information determined by the server.

19. A method of controlling operation of a device, comprising:
   acquiring detection data from at least one sensor device corresponding to movement of the device;
   controlling at least one sensitivity detection mode of the at least one sensor device;
   determining a sampling rate for the at least one sensor device based on the sensitivity detection mode;
   determining gestures performed by a user based on the detection data from the at least one sensor device; and
   controlling operation of the device based on the gestures performed by the user.

20. A non-transitory computer readable medium having instructions stored therein that, when executed by one or more processors, cause the one or more processors to perform a method of controlling operation of a device, wherein the device includes a motion sensor, the method comprising:
   acquiring detection data from at least one sensor device corresponding to movement of the device;
   controlling at least one sensitivity detection mode of the at least one sensor device;
   determining a sampling rate for the at least one sensor device based on the sensitivity detection mode;
   determining gestures performed by a user based on the detection data from the at least one sensor device; and
   controlling operation of the device based on the gestures performed by the user.

* * * * *